Sept. 13, 1955

A. MOTTU 2,717,522

PLAY COMPENSATING DEVICE FOR THE
GEAR WHEELS OF A KINEMATIC CHAIN

Filed Dec. 30, 1952

Inventor
Andre Mottu
By Robert E Burns
Attorney.

Sept. 13, 1955
A. MOTTU
2,717,522
PLAY COMPENSATING DEVICE FOR THE
GEAR WHEELS OF A KINEMATIC CHAIN
Filed Dec. 30, 1952
2 Sheets-Sheet 2
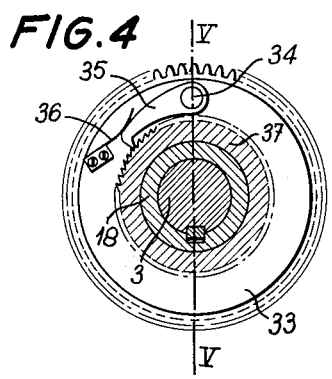
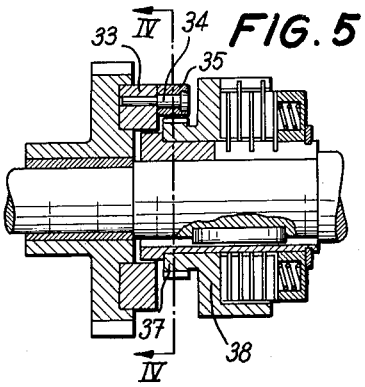
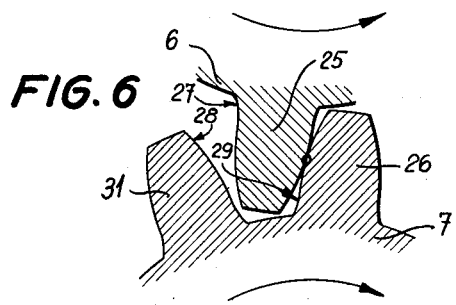
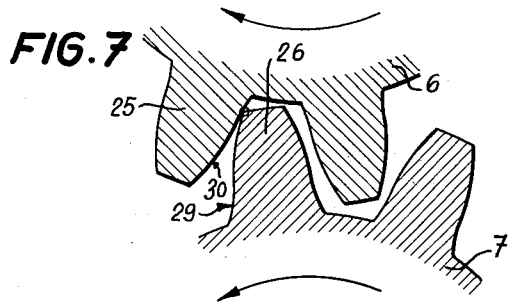
Inventor
Andre Mottu
By Robert E. Burns
Attorney

United States Patent Office 2,717,522
Patented Sept. 13, 1955

2,717,522

PLAY COMPENSATING DEVICE FOR THE GEAR WHEELS OF A KINEMATIC CHAIN

André Mottu, Genthod, Switzerland, assignor to Societe Genevoise d'Instruments de Physique, Geneva, Switzerland, a firm of Switzerland Application December 30, 1952, Serial No. 328,576

Claims priority, application Switzerland January 7, 1952

5 Claims. (Cl. 74—409)

The present invention has for its object a play compensating device for the gear wheels of a kinematic chain, such as that constituted by the gearwork controlling a lathe or a truing machine.

Various systems have already been proposed for such a compensation of the play arising between interengaging gear wheel teeth. According to one known arrangement, one of the toothed wheels is subdivided into two halves separated by a plane perpendicular to its axis. One of said halves is rigidly coupled with the driving shaft while the second half is loosely mounted on said shaft. Said halves are interconnected by yielding means that are generally constituted by one or more springs. The teeth of the wheel with which the two halves of the wheel mesh are thus held accurately in position without any play between the corresponding teeth of the two halves of the first-mentioned wheel and the teeth on the cooperating wheel.

This prior arrangement shows the drawback of its not being applicable otherwise than to the case of spur gears. On the other hand, the elastic means connecting the two halves of the wheel should be powerful enough to provide for the transmission without any play of torques that may be considerable. This leads to an exaggerated wear of the teeth.

The arrangement according to my invention cuts out the drawbacks inherent to the prior arrangements of this latter type. The invention consists in that the last driven wheel of the kinematic chain is submitted to the action of an auxiliary driving mechanism including a sliding coupling device that is operative in a single direction of rotation so as to drive said wheel at a speed slightly above that which the said kinematic chain would normally impart thereto, the difference of said speeds being absorbed by the sliding coupling device or clutch.

Accompanying drawings show, by way of a mere example, a preferred embodiment of the device according to my invention, together with a modification thereof. In said drawings:

Fig. 4 is a cross-section of a modification, said cross-section similar to that of Figs. 2 and 3, being made through line IV—IV of Fig. 5.

Fig. 5 is a longitudinal cross-section of said modification through line V—V of Fig. 4.

Figs. 6 and 7 illustrate the action of the device according to the present invention on a pair of interengaging toothed wheels.

Figure 1:
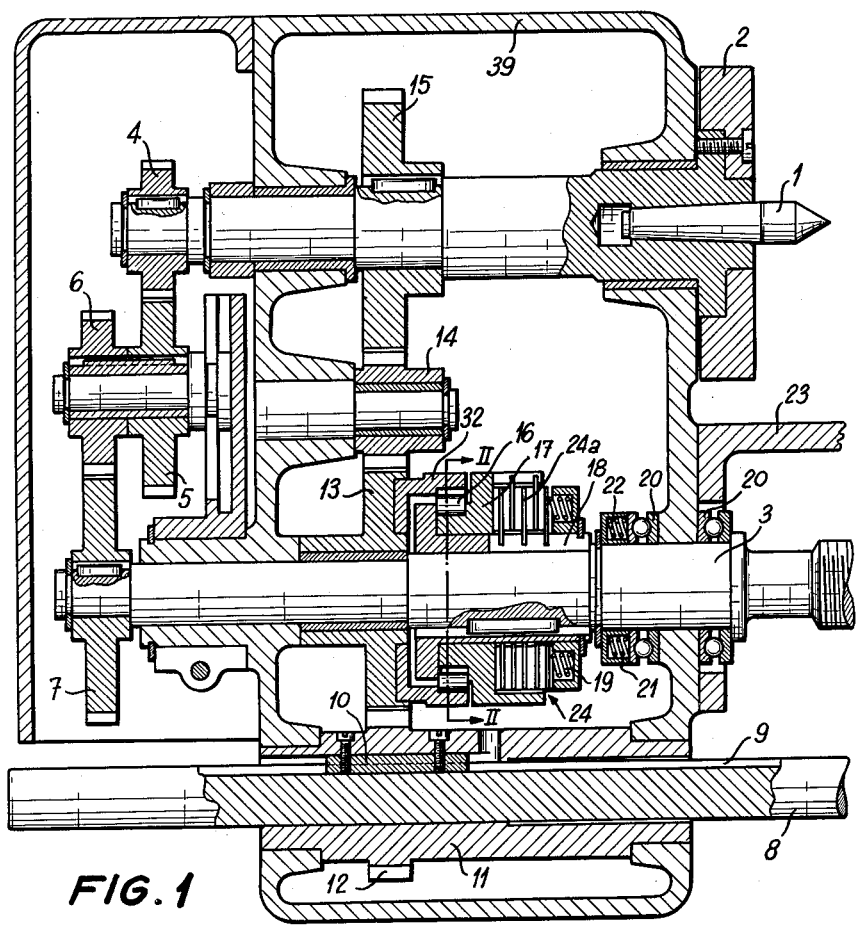
Fig. 1 is a developed diagrammatic section through the headstock of a machine such as a thread grinding machine.

In the machine illustrated, a headstock 39 carries revolubly a spindle 1 rigid with a plate 2 and adapted to drive the work to be ground, that is not illustrated, while transmitting simultaneously to a lead screw 3 a rotary movement through the agency of a gearwork 4, 5, 6, 7, the ratio between the gears of which varies in accordance with the pitch of the thread to be machined.

The drive is obtained through a change speed gear, which is not illustrated, acting through the agency of the shaft 8 provided with a groove 9 inside which is fitted a key 10 secured to a sleeve 11 revolubly carried in the headstock 39.

Said sleeve 11 is provided with teeth 12 which, through the agency of a toothed wheel 13 loosely mounted on the lead screw 3, of a pinion 14 and of a toothed wheel 15, control the rotation of the spindle 1.

Figure 2:
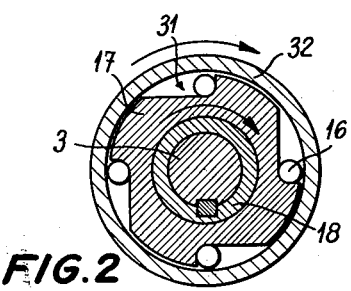
Fig. 2 is a cross-section of a detail, the section being made through line II—II of Fig. 1, for one direction of rotation of the machine.
Figure 3:
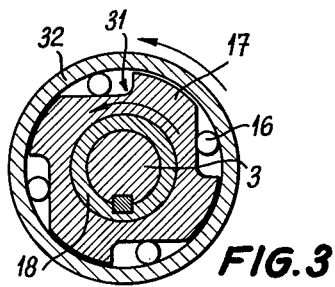
Fig. 3 is a section similar to that of Fig. 2 corresponding to the rotation of the machine in the opposite direction.

The actual play compensating device includes a cylindrical rim 32 rigid with the toothed wheel 13, while a system of four rollers 16 is held between a driving flange 17 mounted on the lead screw and provided with recesses 31 carrying said rollers the transverse shape of which recesses appears in Figs. 2 and 3, and the inner periphery of the cylindrical rim 32 rigid with the toothed wheel 13; the rollers 16 provide, for a predetermined direction of rotation, the synchronous rotation of the flange 17 and of the wheel 13. In this case, the flange 17 rotates at a speed defined by the speed of the shaft 8 and the speed reduction ratio between the wheel 13 and the teeth 12 whereas the sleeve 18, revolving in unison with the lead screw, carrying it, revolves at a lower speed. The cylindrical rim 32 and the flange 17 revolve in the same direction. The connection between the flange 17 and the sleeve 18 is provided by means of a friction clutch 24 comprising a set of discs 24a urged against one another by means of a series of springs 19. As the flange 17 revolves at a higher speed than the lead screw 3, the latter is urged into rotation by the friction clutch, so that rotation of the lead screw is braked by the gearwork 4, 5, 6, 7, instead of being driven by the latter.

The headstock is secured to a carriage 23 adapted to slide over slideways formed in a frame that is not illustrated.

The lead screw 3 moves longitudinally in unison with said carriage 23 by reason of the presence of the stops 20 to either side of the head stock wall, the play between which stops is obtained automatically by the compression means 21 rigid with the lead screw and enclosing springs 22 which hold permanently the cooperating stops 20 in engagement. The energy of said springs 22 is higher than the resistance afforded by the friction of the carriage over the frame of the machine.

Fig. 2 illustrates the driving means operating in a predetermined direction whenever the lead screw considered as seen from the end nearest the toothed wheel 7, revolves clockwise. The rim 32 rigid with the toothed wheel 13 revolves as disclosed at a higher speed than the lead screw. The rollers 16 engage the radial terminal walls of the recesses 31 formed in the flange 17 and consequently the latter is free with reference to the rim 32 as, in the position, the rollers benefit by the clearances between the corresponding recesses 31 and the inner wall of the rim. Consequently, the lead screw 3 is driven then solely through the gearwheels 4, 5, 6 and 7.

Fig. 3 shows the same driving means when the spindle revolves in a direction opposed to that illustrated in Fig. 2. The lead screw turns then in the said opposite direction and the rollers 16 are carried along by the rim 32 and are wedged inside the recesses 31 between the rim 32 and the flange 17, whereby the latter is carried along at a speed higher than that of the lead screw. Through the agency of the discs 24a of the clutch and of the sleeve 18, the rotation of the lead screw becomes higher than that which would be imparted thereto directly by the gearwheels 4, 5, 6 and 7. The lead screw is then driven by the toothed wheel 13 through the rim 32 and the clutch 24 while the gearwheels 4, 5, 6 and 7 brake the movement of said lead screw. Consequently, the same flanks of the gearwheel teeth 4, 5, 6 and 7 are in contacting relationship, whatever may be the direction of rotation of the lead screw 3.

In the modification illustrated in Figs. 4 and 5, the rim 32 is replaced by a plate 33 in which is mounted the spindle 34 carrying the pawl 35. The latter is urged by a spring 36 into engagement with a ratchet wheel 37 rigid with a plate 38 playing the part of the flange 17 illustrated in Figs. 1 to 3. The teeth of the ratchet wheel 37 are shaped in a manner such that the pawl 35 drives the ratchet wheel only when the lead screw 3 and the plate 33, the rotation of which is performed at a higher speed than that of the lead screw, revolve anticlockwise. In contradistinction, when the lead screw 3 and the plate 33 revolve clockwise, the catch 35 rides over the teeth of the ratchet wheel 37 and does not carry the latter along with it.

Fig. 6 illustrates a section of the system of teeth carried by the wheels 6 and 7 when the lead screw revolves clockwise, i. e. in the case where the auxiliary driving means 13—18 are inoperative. The teeth 25 of the driving wheel 6 is in operative contacting relationship with the left hand flank 29 of the tooth 26 of the driven wheel 7 If the direction of rotation were reversed without any improved play-compensating device being provided, the left-hand flank 27 of the tooth 25 would engage the right hand flank 28 on the adjacent tooth 31. However, as illustrated in Fig. 7, which shows the wheels 6 and 7 during said anticlockwise rotation of the wheel 7, the flank 29 of the tooth 26 is again in contacting relationship with the right hand flank 30 of the tooth 25 by reason of the fact that, according to my invention, the clutch 24 accelerates the rotation of the lead screw and thereby of the pinion 7.

There is thus provided a compensation for the play between the gearwheels whatever may be their direction of rotation. The gearwheels may be worm wheels, bevel wheels, as well as spur wheels and they may be interchangeable or otherwise, as the compensation of the play is provided exclusively during the rotation of the device.

What I claim is:

1. In a kinematic chain including at least two intermeshing toothed gearwheels, one of which is driving and the other is driven, chiefly for the control of machine-tools, in combination an auxiliary driving device for compensating the play between the teeth of said wheels, operatively connected with said driven wheel and urging it to rotate at a higher speed than that imparted thereto by the driving wheel, said auxiliary driving device comprising a friction coupling which absorbs the increase in speed under the braking action of the slower control provided by the kinematic chain, and a free wheel coupling whereby said auxiliary driving device acts for one direction of rotation only.

2. In a kinematic chain including a driving member and a plurality of successive driven gear-wheels, chiefly for the control of machine tools, in combination an auxiliary driving member, a friction coupling, means connecting operatively the input of said coupling with said auxiliary driving member for one direction of rotation only and means connecting permanently the output of the friction coupling with said last driven gearwheel to urge it forwardly at a speed that is higher than that of the last driven gearwheel in the kinematic chain when the coupling revolves in the operative direction considered, said friction coupling absorbing the increase in speed under the braking action of the slower control provided by the kinematic chain, the whole in such a way that the same flanks of the gearwheels are in relationship, whatever may be the direction of rotation of the driving member.

3. In a kinematic chain including a driving member and a plurality of successive driven gearwheels, chiefly for the control of machine tools, in combination an auxiliary driving member, a friction coupling, a pawl and ratchet system connecting operatively the input of said coupling with said auxiliary driving member for one direction of rotation only and means connecting permanently the output of the friction coupling with said last driven gearwheel to urge it forwardly at a speed that is higher than that of the last driven gearwheel in the kinematic chain when the coupling revolves in the operative direction considered, said friction coupling absorbing the increase in speed under the braking action of the slower control provided by the kinematic chain, the whole in such a way that the same flanks of the gearwheels are in relationship, whatever may be the direction of rotation of the driving member.

4. In a kinematic chain including a driving member and a plurality of successive driven gearwheels, chiefly for the control of machine tools, in combination an auxiliary driving member, a friction coupling, a free wheel system connecting operatively the input of said coupling with said auxiliary driving member for one direction of rotation only and means connecting permanently the output of the friction coupling with said last driven gearwheel to urge it forwardly at a speed that is higher than that of the last driven gearwheel in the kinematic chain when the coupling revolves in the operative direction considered, said friction coupling absorbing the increase in speed under the braking action of the slower control provided by the kinematic chain, the whole in such a way that the same flanks of the gearwheels are in relationship, whatever may be the direction of rotation of the driving member.

5. In a kinematic chain including a driving member and a plurality of successive driven gearwheels, chiefly for the control of machine tools, in combination an auxiliary driving member, means whereby the driving member of the kinematic chain drives said auxiliary driving member, a friction coupling, means connecting operatively the input of said coupling with said auxiliary driving member for one direction of rotation only and means connecting permanently the output of the friction coupling with said last driven gearwheel to urge it forwardly at a speed that is higher than that of the last driven gearwheel in the kinematic chain when the coupling revolves in the operative direction considered, said friction coupling absorbing the increase in speed under the braking action of the slower control provided by the kinematic chain, the whole in such a way that the same flanks of the gearwheels are in relationship, whatever may be the direction of rotation of the driving member.

References Cited in the file of this patent

UNITED STATES PATENTS

| 1,124,107 | Bugatti | Jan. 5, 1915 |
| 1,570,372 | Buckingham | Jan. 19, 1926 |

FOREIGN PATENTS

| 495,901 | Great Britain | Nov. 22, 1938 |